W. L. BAUGH.
FEED TROUGH.
APPLICATION FILED DEC. 27, 1911.
1,043,795.
Patented Nov. 12, 1912.
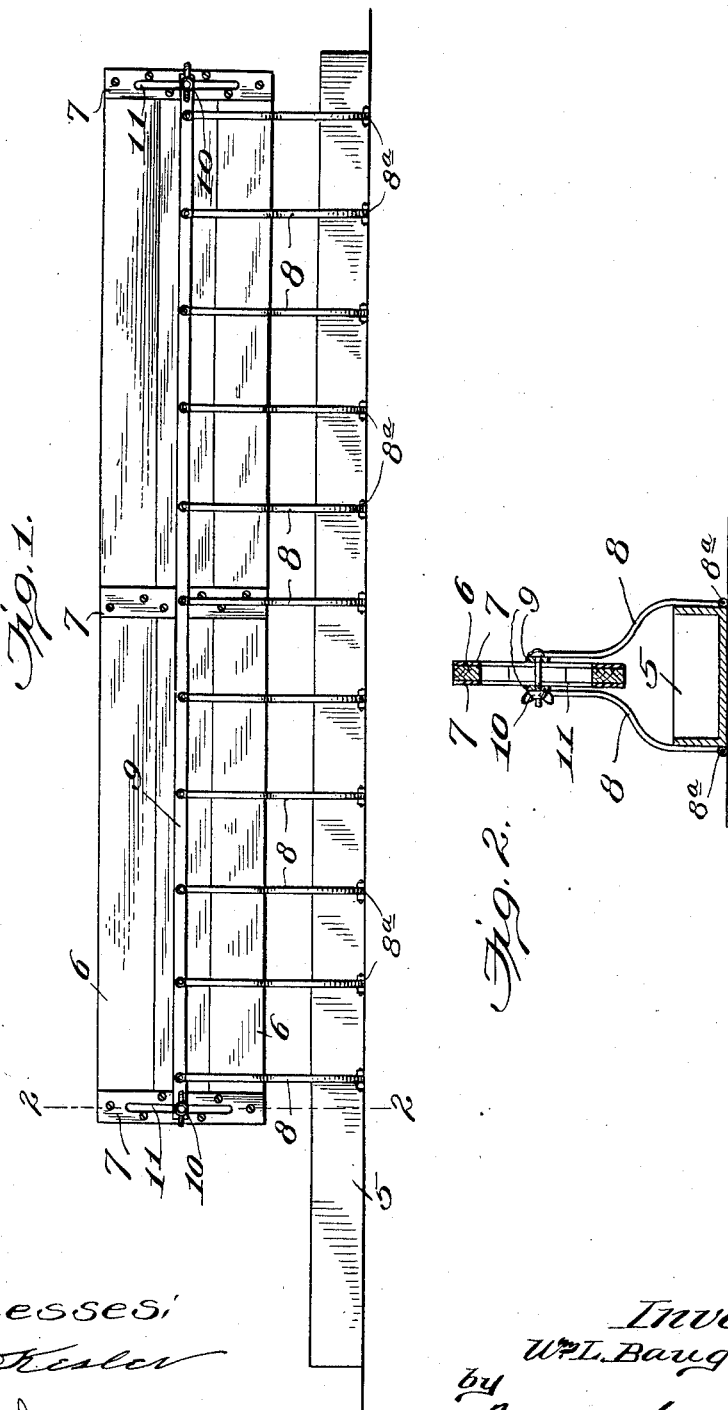

UNITED STATES PATENT OFFICE.

WILLIAM L. BAUGH, OF MOUNT VERNON, MISSOURI.

FEED-TROUGH.

1,043,795.  Specification of Letters Patent.  Patented Nov. 12, 1912.

Application filed December 27, 1911. Serial No. 668,158.

*To all whom it may concern:*

Be it known that I, WILLIAM L. BAUGH, a citizen of the United States, residing at Mount Vernon, in the county of Lawrence and State of Missouri, have invented certain new and useful Improvements in Feed-Troughs, of which the following is a specification.

This invention relates to feed troughs for stock and poultry and its object is to provide a novel and improved guard attachment which will separate the animals and prevent fighting and waste of feed.

In order that the invention may be better understood, reference is had to the accompanying drawing forming a part of this specification, in which—

Figure 1 is a front elevation, and Fig. 2 a cross-section on the line 2—2 of Fig. 1.

Referring specifically to the drawing, 5 denotes an ordinary feed trough of any suitable dimension. Above the trough, in line with the longitudinal center thereof, is located a dividing device 6 to prevent the animals from fighting across when they are eating from both sides of the trough. This dividing device may be constructed of several boards to get the desired height, said boards being connected by any suitable means. Metal strips 7 at the ends and center of the boards may be employed for connecting the same. The trough may be constructed of wood or metal, and the dividing device may also be constructed of metal strips.

The following means are provided for supporting the dividing device: To each side of the trough 5 is secured a series of metal bars 8 which are connected at their lower ends to the trough by a hinge joint 8ª. The bars extend from the trough in an inward curve and at their upper ends they carry a longitudinal bar 9. A series of bars 8 and a longitudinal bar 9 are located on each side of the trough, and the dividing device 6 is held between said longitudinal bars by means of thumb screws 10 carried by the ends of the longitudinal bars and passing through vertical slots 11 in the dividing device and the end strips 7 thereof. This connection permits the dividing device to be raised or lowered relative to the trough as may be desired.

The bars 8 are spaced suitable distances apart and serve as guards or spacers to separate the animals sidewise and prevent fighting alongside the trough, and said bars also prevent the animals from getting their bodies close enough to the trough to stick their feet thereinto. The trough can therefore be kept in a sanitary condition and waste of feed is prevented. For poultry troughs the bars 8 can be placed closer together.

The dividing device 6 does not extend entirely to one end of the trough in order that said end may be protruded through a fence, thus keeping the feeder away from the animals while feeding slop or swill.

The attachment herein described is simple and can be easily and cheaply constructed, and it effectually serves the purpose for which it is designed. By providing a hinge joint for the bars 8, they may be let down after removing the thumb screws 10, so that the trough can be easily cleaned.

I claim:

The combination with a feed trough; of spacing bars extending upward from the sides thereof, longitudinal bars carried by the upper ends of the spacing bars, a dividing device carried by the longitudinal bars and extending lengthwise of the trough above the same, said dividing device having vertical slots in its ends, and clamping means passing through the slots and the longitudinal bars.

In testimony whereof I affix my signature in presence of two witnesses.

WILLIAM L. BAUGH.

Witnesses:
 JANIE McDONALD,
 H. K. MILLSAP.

Copies of this patent may be obtained for five cents each, by addressing the "Commissioner of Patents, Washington, D. C."